United States Patent
Van Belzen et al.

(10) Patent No.: US 11,332,412 B2
(45) Date of Patent: May 17, 2022

(54) UREA-BASED COMPOSITION COMPRISING ELEMENTAL SULPHUR AND METHOD FOR THE MANUFACTURE THEREOF

(71) Applicant: YARA INTERNATIONAL ASA, Oslo (NO)

(72) Inventors: Ruud Van Belzen, CA Middelburg (NL); Filip Colpaert, Zwijnaarde (BE)

(73) Assignee: YARA INTERNATIONAL ASA, Oslo (NO)

(*) Notice: Subject to any disclaimer, the term of this patent is extended or adjusted under 35 U.S.C. 154(b) by 0 days.

(21) Appl. No.: 17/053,334

(22) PCT Filed: May 10, 2019

(86) PCT No.: PCT/EP2019/062036
§ 371 (c)(1),
(2) Date: Nov. 5, 2020

(87) PCT Pub. No.: WO2019/215325
PCT Pub. Date: Nov. 14, 2019

(65) Prior Publication Data
US 2021/0261475 A1    Aug. 26, 2021

(30) Foreign Application Priority Data
May 11, 2018 (EP) .................................. 18171843

(51) Int. Cl.
*C05C 9/00* (2006.01)
*C05G 5/10* (2020.01)
(Continued)

(52) U.S. Cl.
CPC ............. *C05C 9/005* (2013.01); *C05D 5/00* (2013.01); *C05D 9/00* (2013.01); *C05D 9/02* (2013.01);
(Continued)

(58) Field of Classification Search
None
See application file for complete search history.

(56) References Cited

U.S. PATENT DOCUMENTS 3,785,796 A    1/1974   Mann, Jr.
4,530,714 A    7/1985   Kole et al.
(Continued)

FOREIGN PATENT DOCUMENTS

CN    103896672 A    7/2014
CN    103896673 A    7/2014
(Continued)

OTHER PUBLICATIONS

"Guidance for the compatibility of fertilizer blending materials" by EFMA, Brussels, Belgium, Jun. 2006. 16 pages.
(Continued)

*Primary Examiner* — Wayne A Langel
(74) *Attorney, Agent, or Firm* — Dilworth IP, LLC

(57) ABSTRACT

The invention relates to a particulate urea-based composition comprising elemental sulphur and a urease inhibitor of the type phosphoric triamide, wherein the urea-based composition comprising elemental sulphur is further characterized in that it comprises a magnesium sulphate. The composition according to the invention has improved properties for reducing ammonia loss by urease activity in the soil and is in particular suitable as a fertilizer. The invention further relates to a method for the manufacture of a particulate urea-based composition comprising urea, elemental sulphur and a urease inhibitor of the type phosphoric triamide, in particular N-(n-butyl) thiophosphoric triamide (nBTPT), as well as to a composition of kit of parts comprising a magnesium sulphate.

20 Claims, 3 Drawing Sheets

(51) Int. Cl.
　　*C05G 3/90*　　(2020.01)
　　*C05D 5/00*　　(2006.01)
　　*C05D 9/02*　　(2006.01)
　　*C05F 11/00*　　(2006.01)
　　*C05D 9/00*　　(2006.01)
(52) U.S. Cl.
　　CPC ............... *C05F 11/00* (2013.01); *C05G 3/90* (2020.02); *C05G 5/10* (2020.02)

(56) References Cited

U.S. PATENT DOCUMENTS

| | | | |
|---|---|---|---|
| 5,352,265 | A | 10/1994 | Weston et al. |
| 2015/0052960 | A1* | 2/2015 | Makin ................. C05D 9/00 71/30 |
| 2018/0258002 | A1* | 9/2018 | Colpaert ................. C05C 9/005 |

FOREIGN PATENT DOCUMENTS

| | | |
|---|---|---|
| CN | 103524221 B | 6/2015 |
| CN | 104860775 A | 8/2015 |
| CN | 106069441 A | 11/2016 |
| CN | 106588372 A | 4/2017 |
| EP | 0768993 B1 | 4/1997 |
| WO | 9212633 A1 | 8/1992 |
| WO | 9965845 A1 | 12/1999 |
| WO | 2006004424 A1 | 1/2006 |
| WO | 2006093413 A1 | 9/2006 |
| WO | 2014009326 A1 | 1/2014 |
| WO | 2017005695 A1 | 1/2017 |
| WO | 2017042194 A1 | 3/2017 |
| WO | 2017081183 A1 | 5/2017 |
| WO | 2017168288 A1 | 10/2017 |
| WO | 2018069456 A1 | 4/2018 |
| WO | 2018069486 A1 | 4/2018 |

OTHER PUBLICATIONS

Search Report Issued in International Application No. PCT/EP2019/061641, date Aug. 27, 2019, 4 pages.
Search Report Issued in International Application No. PCT/EP2019/061894, dated Aug. 27, 2019, 3 pages.
Search Report Issued in International Application No. PCT/EP2019/062036, dated Aug. 30, 2019, 3 pages.

* cited by examiner

UREA-BASED COMPOSITION COMPRISING ELEMENTAL SULPHUR AND METHOD FOR THE MANUFACTURE THEREOF

SUMMARY OF THE INVENTION

This invention relates to a particulate urea-based composition comprising urea, elemental sulphur and a urease inhibitor of the type phosphoric triamide, in particular N-(n-butyl) thiophosphoric triamide (nBTPT), with improved properties for reducing ammonia loss by urease activity in the soil. The invention further relates to a method for the manufacture of a particulate urea-based composition comprising urea, elemental sulphur, a urease inhibitor of the type phosphoric triamide, in particular N-(n-butyl) thiophosphoric triamide (nBTPT) and a stabiliser. The product is in particular suitable as a fertilizer.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is the basic constituent for any living system as a constituent of protein.

Due to intensive farming and the reduction of sulphur emissions in the air by industry and the subsequent supply to the ground via rain, modern agriculture requires sulphur in addition to nitrogen.

Good agricultural practice usually require nitrogen and sulphur in a ratio 10/1 to 5/1 in order to answer to the crop demand, for example 150 kg nitrogen/ha/year and 30 kg sulphur/ha/year.

Lack of sulphur results both in a lower quantity and a lower quality of crops, and sulphur deficiency is often reflected in the content and type of proteins. Sulphur is indeed a major element entering into the chemistry of the cells in molecules such as amino acids (cysteine, methionine, etc.). It is also a catalyst for the photosynthesis and, in some cases, may improve the fixation of atmospheric nitrogen.

Conventionally, sulphur has been applied to the soil in the form of elemental sulphur, or as compounds such as ammonium sulphate, ammonium bisulphate, thiosulfates, sulphides or gypsum, or in combination with other fertilizer materials such as urea, for example as a physical blend of urea and ammonium sulphate, or as a co-granulated urea and ammonium sulphate material (urea ammonium sulphate, abbreviated as UAS).

This application particularly deals with urea-based compositions comprising sulphur in the form of elemental sulphur. In such compositions, the urea is hydrolysed in the soil under the action of an enzyme catalyst, commonly called urease, to produce ammonia and carbon dioxide, while the sulphur is oxidized by soil bacteria to produce e.g. sulphate ions. Ureases are found in numerous bacteria, fungi, algae, plants and some invertebrates, as well as in soils, as a soil enzyme. Urease activity tends to increase the pH of its environment as the ammonia is dissolved into the water in the soil, which is taken up by the plants as their principle source of nitrogen. However, ammonia can also be released into the atmosphere, thus becoming unavailable for the plant root system, a process called ammonia volatilization. Up to 50 weight % of nitrogen can be lost as a results of the volatilization of ammonia, all depending on the soil type, water content, pH, climate conditions, etc.

The availability of nitrogen, originating from urea, to the root system of plants can be improved by combining (i.e. by incorporation or addition) a urease inhibitor with a urea-based fertilizer. Urease inhibitors are compounds that are capable of temporarily reducing the activity of the enzyme and slow down the rate at which urea is hydrolysed. There are many compounds that can inhibit urease, but only a few that are non-toxic, effective at low concentrations, chemically stable enough and able to be combined with urea-based fertilizers.

Among the most effective urease inhibitors known today are the phosphoric triamide compounds, first disclosed in U.S. Pat. No. 4,530,714 (Allied Corporation, 1985).

An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

When combined with a urea-based fertilizer, phosphoric triamide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-based fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Surprisingly, the inventors have now been confronted with the problem that the urease inhibitor of the type phosphoric triamide, when applied either as a liquid, which is the most common commercially available form, or as a solid, is not stable when in contact with a urea-based composition comprising elemental sulphur. This was all the more surprising as the use of a urease inhibitor of the type phosphoric triamide is generally disclosed for urea-based fertilizers, such as urea, UAS and urea comprising elemental sulphur, and sulphur is a very pure substance that is insoluble in water. Moreover, even a stabilised urease inhibitor of the type phosphoric triamide in an alkaline organic solvent, such as a mixture of propylene glycol and N-methylpyrrolidine is rapidly degraded. In this context, with stability is meant that the original urease inhibitor is chemically degraded. This finding was most surprising, but stimulated the inventors to find a solution for the problem of stabilizing the urease inhibitor (i.e. reducing its degradation) in the presence of urea base material comprising elemental sulphur.

PRIOR ART

The problem of stabilizing a urease inhibitor (i.e. reducing its degradation), in particular nBTPT, in the presence of urea-based material is disclosed in WO2018/069486 (Yara International, 2018), which discloses the addition of an alkaline or alkaline-forming inorganic or organic compound, selected from the group of metal oxides, carbonates, hydroxides, acetates, and organic bases, and mixtures thereof, in particular selected from the group of calcium oxide, zinc oxide, magnesium oxide, calcium carbonate, and mixtures thereof, and/or the addition of an anticaking and/or moisture-repellent coating. Furthermore, in composition comprising urea ammonium sulphate, it was found that, notwithstanding their stabilizing effects, the addition of said compounds induced the production of ammonia by the reaction of the urea ammonium sulphate with the alkaline compound, such as CaO. The release of ammonia may amount to 0.1 to 0.2 vol % during coating. Therefore, there is a need for a better stabilizer that stabilizes a urease inhibitor of the type phosphoric triamide in the presence of urea comprising ammonium sulphate or elemental sulphur, yet does not generate substantial amounts of ammonia, in particular by reaction with the urea ammonium sulphate material, in particular less than 0.1 vol %.

CN106588372 (Anhui Kangmu Int Fertilizer, 2017) discloses a fertilizer composition comprising 1.2% of magnesium sulfate, 1.0% of calcium carbonate, 6.2% of ammonium nitrate, 10.3% of diammonium phosphate 37% of carbamide and 0.82% of nBPT. It does not disclose a fertilizer comprising urea, a urease inhibitor, magnesium sulfate and elemental sulfur, nor the stabilizing effect of magnesium sulfate on nBPT.

CN103524221 (Univ Southwest, 2015) discloses a fertilizer composition comprising 22-25% of urea, 14-17% of monoammonium phosphate, 30-33% of potassium phosphate, 1-3% of calcium carbonate, 5-8% of magnesium sulfate and 0.005-0.008% of nBPT. It does not disclose a fertilizer comprising urea, a urease inhibitor, magnesium sulfate and elemental sulfur nor the stabilizing effect of magnesium sulfate on nBPT.

WO2017/168288 (BASF, 2017) discloses a fertilizer composition comprising 10 g of urea treated with 0.4% of an active ingredient comprising nBPT, 0.5 g of anhydrous magnesium sulfate and 10 g of DAP. It does not disclose a fertilizer composition comprising urea, a urease inhibitor, magnesium sulfate and elemental sulfur.

Statement of the Invention

Surprisingly, the inventors now found that the stability of the urease inhibitor of the type phosphoric triamide in the presence of a urea base material comprising elemental sulphur can be greatly improved when a magnesium sulphate is applied to the urea base material.

In its broadest concept, the invention is concerned with a particulate urea-based composition comprising a particulate urea base material, elemental sulphur and a urease inhibitor of the type phosphoric triamide, wherein the urea-based composition is further characterized in that it comprises a magnesium sulphate. In particular, the invention is concerned with a homogeneous, solid, particulate urea-based composition comprising a particulate urea base material, elemental sulphur and a urease inhibitor of the type phosphoric triamide, wherein the urea-based composition is further characterized in that it comprises a magnesium sulphate.

By applying a magnesium sulphate to the particulate urea-based composition comprising a particulate urea base material, elemental sulphur, and a urease inhibitor of the type phosphoric triamide, the stability of the urease inhibitor of the type phosphoric triamide is greatly improved, leading, among others, to lower ammonia emissions, even when the urease inhibitor of the type phosphoric triamide was added to the urea-based composition a long time before the actual application on the field as a fertilizer. Furthermore, it was found that the stabilizer according to the invention stabilizes a urease inhibitor of the type phosphoric triamide in the presence of urea base material, such as urea ammonium sulphate, comprising elemental sulphur, and does not generate ammonia, in particular by reaction with the urea ammonium sulphate material.

By the integration of the stabilizer into the urea-based composition comprising a urease inhibitor of the type phosphoric triamide, the stability of the urease inhibitor of the type phosphoric triamide is greatly improved, especially during storage, such that lower amounts of said urease inhibitor may be used.

According to a particular embodiment of the present invention, the magnesium sulphate is present in the composition at a level of 0.0001 to 5 weight %, preferable 0.02 to 1 weight %, most preferably 0.05 to 1 weight %, relative to the total weight of the composition.

According to a particular embodiment of the present invention, the magnesium sulphate is selected from the group of anhydrous, mono-, di-, tri-, tetra-, penta-, hexa-, heptahydrate, and mixtures thereof.

According to a particular embodiment of the present invention, the magnesium sulphate has a purity of >70%, preferably >80%, more preferably >90%, most preferably >99%.

According to a particular embodiment of the present invention, the urease inhibitor of the type phosphoric triamide is a compound of formula I:

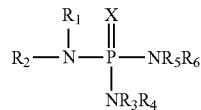

Formula I wherein:

X is oxygen or sulphur;

$R_1$ is alkyl, cycloalkenyl, aralkyl, aryl, alkenyl, alkynyl, or cycloalkyl;

$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system;

$R_3$, $R_4$, $R_5$ and $R_6$ are individually hydrogen or alkyl having 1 to 6 carbon atoms; and alkyl, cycloalkenyl, aralkyl, aryl, alkenyl, alkynyl, and cycloalkyl refer to compounds having from 1 to 10 carbon atoms, preferably from 1 to 6 carbon atoms.

According to a particular embodiment of the present invention, the urease inhibitor the urease inhibitor is N-(n-butyl) thiophosphoric triamide (nBTPT).

According to a particular embodiment of the present invention, the urease inhibitor, in particular N-(n-butyl) thiophosphoric triamide (nBTPT) is present in the urea-based blend composition at a level of 0.0001 to 1 weight %, preferable 0.02 to 0.2 weight %, most preferably 0.03 to 0.06 weight %, relative to the total weight of the urea-based blend composition.

According to a particular embodiment of the present invention, the weight ratio of urease inhibitor of the type phosphoric triamide to magnesium sulphate ranges from 1:20 to 1:1, preferably from 1:15 to 1:1, more preferably from 1:10 to 1:1

According to a particular embodiment of the present invention, the urease inhibitor is present onto the urea base material in liquid or in particulate form, is present as a melt-mixed component within the particles of the urea base material, or a combination thereof.

According to a particular embodiment of the present invention, the urea-based composition further comprises an alkaline or alkaline-forming compound, selected from the group of calcium oxide, zinc oxide, magnesium oxide, calcium carbonate, and mixtures thereof.

According to a particular embodiment of the present invention, the weight ratio of said alkaline or alkaline-forming compound to magnesium sulphate ranges from 1:20 to 1:2, preferably from 1:15 to 1:2, more preferably from 1:10 to 1:2.

According to a preferred embodiment of the present invention, the urea-based composition further comprises anti-caking and/or moisture-repellent and/or anti-dust material, preferably present as a coating to the urea base particulate material.

According to a particular embodiment of the present invention, the anticaking and/or moisture-repellent and/or anti-dust coating comprising at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

According to a particular embodiment of the present invention, the urea-based composition comprises 50 to 99.9 weight %, preferably 75 to 99.9 weight %, more preferably 90 to 99.9 weight % of a urea base material in particulate form, relative to the total weight of the urea-based composition.

According to a particular embodiment of the present invention, the urea-based composition comprises at least 50 weight %, preferably at least 75, more preferably at least 90 weight % of a urea base material in particulate form, relative to the total weight of the urea-based composition.

According to a particular embodiment of the present invention, the urea base material is selected from the group of urea, urea-ammonium sulphate, urea-ammonium phosphate, and any combination thereof.

According to a particular embodiment of the present invention, the urea base material comprises 0.1 to 20 weight % of elemental sulphur, relative to the total weight of the urea base material.

According to a particular embodiment of the present invention, the urea base material comprises finely divided sulphur particles in the urea base material, or a urea base material coated with elemental sulphur.

According to a particular embodiment of the present invention, the average particle size (dp50) of the urea base material in particulate form is between 1 mm and 5 cm, as determined by mesh sieve screening.

According to a particular embodiment of the present invention, the urea-based composition comprises 90 to 99.9 weight % of a urea base material comprising 0.1 to 20 weight % of elemental sulphur, 0.03 to 0.06 weight % of nBTPT, 0.05 to 0.1 weight % of magnesium sulphate, and 0.015 to 0.03 weight % of magnesium oxide; adding up to 100 weight %, being the total weight of the composition.

In its broadest concept, the invention is also concerned with the use of the particulate urea-based composition according to the invention as a fertilizer, in particular for supporting the growth of agricultural products on a sulphur—deficient soil.

According to a particular embodiment of the present invention, the use is as an animal feed.

In its broadest concept, the invention is also concerned with a method for the manufacture of a particulate urea-based composition according to the invention, the method comprising the steps of:

1) providing a urea base material comprising urea and elemental sulphur;
2) providing 0.0001 to 5 weight %, relative to the total weight of the composition, of a magnesium sulphate;
3) providing 0.0001 to 1% weight %, relative to the total weight of the composition, of a urease inhibitor of the type phosphoric triamide, preferably N-(n-butyl) thiophosphoric triamide (nBTPT);
4) optionally, providing 0.0001 to 1% weight %, relative to the total weight of the composition, of an alkaline or alkaline-forming compound, selected from the group of calcium oxide, zinc oxide, magnesium oxide, calcium carbonate, and mixtures thereof, and
5) optionally, providing coating material wherein the coating material is able to increase at least the anticaking and/or moisture repellence and/or anti-dust properties of said urea-based composition; and
6) adding the components provided in steps 2), 3), 4) and 5) in any order to the component, provided in step 1).

In its broadest concept, the invention is also concerned with a kit of parts, comprising an amount of
a) magnesium sulphate;
b) a urease inhibitor of the type phosphoric triamide, preferably N-(n-butyl) thiophosphoric triamide (nBTPT);
c) optionally, an alkaline or alkaline-forming compound, selected from the group of calcium oxide, zinc oxide, magnesium oxide, calcium carbonate, and mixtures thereof, and
d) optionally, one or more anti-caking and/or moisture-repellent and/or anti-dust compounds.

In its broadest concept, the invention is also concerned with a method for improving the stability of a urease inhibitor of the type phosphoric triamide, in particular N-(n-butyl) thiophosphoric triamide, (nBTPT) in a urea-based composition comprising a urea base material, elemental sulphur and said urease inhibitor, by the addition to said composition of 0.0001 to 5 weight %, relative to the total weight of the composition, of a magnesium sulphate, and optionally, by the addition of 0.0001 to 1% weight %, relative to the total weight of the composition, of an alkaline or alkaline-forming compound, selected from the group of calcium oxide, zinc oxide, magnesium oxide, calcium carbonate, and mixtures thereof.

The invention will now be described in more detail.

DETAILED DESCRIPTION OF THE INVENTION

In its broadest concept, the invention is concerned with a particulate urea-based composition comprising a particulate urea base material, elemental sulphur and a urease inhibitor of the type phosphoric triamide, wherein the urea-based composition is further characterized in that it comprises a magnesium sulphate.

Within the context of this application, with a particulate form is meant a solid physical form that can also be designated as granulated, prilled, crystalline, compacted, powdered, and the like, wherein the respective compound is in a small unit form. Preferably, the urea-based component is a granule or prill, the magnesium sulphate is a powder, the urease inhibitor is a powder and the alkaline or alkaline-forming compound, selected from the group of calcium oxide, zinc oxide, magnesium oxide, calcium carbonate is a powder.

In particular embodiments, the invention is concerned with a homogeneous, solid, particulate urea-based composition comprising a particulate urea base material, elemental sulphur and a urease inhibitor of the type phosphoric triamide, wherein the urea-based composition is further characterized in that it comprises a magnesium sulphate.

Magnesium Sulphate

According to a particular embodiment of the present invention, the invention is concerned with a particulate urea-based composition comprising a urea base material, elemental sulphur, and a urease inhibitor of the type phosphoric triamide, wherein the urea-based composition is characterized in that it comprises a magnesium sulphate.

According to a particular embodiment of the present invention, the magnesium sulphate is present in the composition at a level of 0.0001 to 5 weight %, preferable 0.02 to 1 weight %, most preferably 0.05 to 1 weight %, relative to the total weight of the composition. From experiments, it was observed that more than 1 weight % did not produce a proportionally better stabilizing effect.

Magnesium sulphate is an inorganic salt with the chemical formula $MgSO_{4-x}(H_2O)$ where $0 \leq x \leq 7$. It is solid at room temperature and is available in powder form with various average particle sizes ($d_{50}$), such as between 5 and 1000 μm. A variety of hydrates is known. The heptahydrate $MgSO_4 \cdot 7(H_2O)$ (epsomite) can be prepared by neutralizing sulfuric acid with magnesium carbonate or oxide, but it is usually obtained directly from natural sources. The heptahydrate readily loses one equivalent of water to form the hexahydrate. The monohydrate, $MgSO_4 \cdot H_2O$ is found as the mineral kieserite. It can be prepared by heating the hexahydrate to approximately 150° C. Further heating to approximately 200° C. gives anhydrous magnesium sulphate.

According to a particular embodiment of the present invention, the magnesium sulphate is selected from the group of anhydrous, mono-, di-, tri-, tetra-, penta-, hexa-, heptahydrate, and mixtures thereof. Preferably, the magnesium sulphate is anhydrous magnesium sulphate. It was found that presence of water molecules in the magnesium sulphate could have some negative influence on the hygroscopic quality of the composition.

According to a particular embodiment of the present invention, the magnesium sulphate has a purity of >70%, preferably >80%, more preferably >90%, most preferably >99%.

The magnesium sulphate may be applied to the composition of the present invention by common application techniques, such as coating and blending techniques, well known to the skilled person, such as spray-coating and drum-coating. It is preferred that the magnesium sulphate and the urease inhibitor of the type phosphoric triamide is in intimate contact with each other, in order for the magnesium sulphate to be effective. This can be achieved, most preferably, through the application of the urease inhibitor of the type phosphoric triamide, the magnesium sulphate, and optionally the anticaking and/or moisture-repellent coating to the particulate composition according to the invention, either successively, or simultaneously, for example as a liquid anticaking and/or moisture-repellent coating composition comprising the urease inhibitor of the type phosphoric triamide and the magnesium sulphate.

Urease Inhibitor

According to a particular embodiment of the present invention, the invention is concerned with a particulate urea-based composition comprising a urea base material, elemental sulphur, and a urease inhibitor of the type phosphoric triamide, in particular N-(n-butyl) thiophosphoric triamide (nBTPT), wherein the urease inhibitor of the type phosphoric triamide is a compound of formula I:

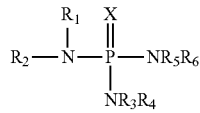

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

The terms alkyl, cycloalkenyl, aralkyl, aryl, alkenyl, alkynyl, and cycloalkyl as used herein, refer to compounds having from up to 10 carbon atoms, preferably up to 6 carbon atoms. The lowest number of carbon atoms is between 1-3 depending on the structure of the substituent.

nBTPT is sold as the most effective known urease inhibitor and has the following chemical formula II

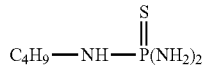

Formula II

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In order to be effective, the urease inhibitor of the type phosphoric triamide, in particular N-(n-butyl) thiophosphoric triamide (nBTPT) is present in the urea-based composition at a level of 0.0001 to 1% weight %, preferably 0.02 to 0.2% weight %, most preferably 0.03 to 0.06 weight %, relative to the total weight of the urea-based composition.

As generally referred to herein and unless indicated otherwise, weight % refers to the weight percentage of an ingredient of a composition, relative to the total weight of said composition.

According to one embodiment, the weight ratio of urease inhibitor of the type phosphoric triamide to magnesium sulphate ranges from 1:20 to 1:1, preferably from 1:15 to 1:1, more preferably from 1:10 to 1:1. An exemplary weight ratio is 1:10.

According to one embodiment, the urease inhibitor can be a liquid at room temperature, a liquid at elevated temperature, or a solid which is dissolved (solution) or suspended (suspension) into a liquid carrier, all of which are different liquid forms of the urease inhibitor of the type phosphoric triamide, in particular N-(n-butyl) thiophosphoric triamide (nBTPT).

In embodiments where the urease inhibitor of the type phosphoric triamide, in particular N-(n-butyl) thiophosphoric triamide (nBTPT), is used as a liquid, it is preferably used as a 0.1 to 75 weight % solution, preferably as a 15 to 30 weight % solution, relative to the total weight of the solution. Commercial solutions are available, for example as Agrotain® Ultra (Koch, US), N Yield™ (Eco Agro, The Netherlands), Rhodia Ag-Rho™ N Protect B (Solvay, Germany), Iper N-Protect Liquid (Van Iperen, The Netherlands) and BASF Limus (BASF, Germany).

In embodiments where the urease inhibitor nBTPT is used as a liquid, dissolved into a carrier, it can be used as a powder, dissolved in propylene glycol, for example as 17,5 weight % of nBTPT. It is available from Yara International ASA (Norway) as Amiplus® liquid.

Experiments showed that, in compositions according to the invention, less urease inhibitor of the type phosphoric triamide, in particular N-(n-butyl) thiophosphoric triamide (nBTPT) needs to be used than is commonly employed in the prior art. For example, according to the invention, an amount of 0.05 weight % is most preferred, while for the use of Agrotain® Ultra, an amount of 0.09 weight % is recommended. This finding can at least partly be attributed to the fact that in the compositions according to the invention, the urease inhibitor of the type phosphoric triamide, in particular N-(n-butyl) thiophosphoric triamide (nBTPT) is stabilized, while in the prior art, an overdose is needed to compensate for the degradation of the urease inhibitor and to increase shelf-live thereof. This finding also ensures that less urease inhibitor of the type phosphoric triamide, in particular N-(n-butyl) thiophosphoric triamide (nBTPT) is introduced into the environment.

In embodiments where the urease inhibitor is used in its solid form, it is used as a powder, preferably with a purity of 99 weight % or more. It is available, for example, from Sunfit Chemical Co. (China).

The urease inhibitor of the type phosphoric triamide, in particular N-(n-butyl) thiophosphoric triamide (nBTPT) can be applied to the urea base material by common coating and blending techniques, well known to the skilled person, such as spray-coating and drum-coating.

The urease inhibitor of the type phosphoric triannide, in particular N-(n-butyl) thiophosphoric triannide (nBTPT) can also be applied to the urea base material by hot melt mixing, as described in U.S. Pat. No. 5,352,265 (Weston et al., 1994) for urea, which discloses that nBTPT is incorporated into the homogeneous granular fertilizer composition by blending a concentrated solution of nBTPT in a solvent selected from the group of liquid amides, 2-pyrrolidone, and N-alkyl 2-pyrrolidones, directly into the molten urea prior to its granulation.

Therefore, a urea-based composition is claimed, wherein the urease inhibitor of the type phosphoric triannide is present onto the urea base material in liquid or in particulate form, is present as a melt-mixed component within the particles of the urea base material, or a combination thereof.

Further Alkaline or Alkaline-Forming Compounds (Co-Stabilizer)

According to a particular embodiment of the invention, the urea-based composition further comprises an alkaline or alkaline-forming compound, selected from the group of calcium oxide, zinc oxide, magnesium oxide, calcium carbonate, and mixtures thereof.

Surprisingly, it was found that the addition of an amount of one or more of the abovementioned compounds increases the stability properties of magnesium sulphate to stabilize a urease inhibitor of the type phosphoric triannide in the presence of the urea base material, in particular urea ammonium sulphate material, without generating substantial amounts of ammonia, in particular by reaction with the urea ammonium sulphate material.

According to one embodiment, the weight ratio of said alkaline or alkaline-forming compound to magnesium sulphate ranges from 1:20 to 1:2, preferably from 1:15 to 1:2, more preferably from 1:10 to 1:2. Exemplary weight ratios are about 1:10 and about 1:3, i.e. the amount of alkaline or alkaline-forming compound is always smaller than the amount of magnesium sulphate. According to one embodiment, the amount of alkaline or alkaline-forming compound is 2, 3, 5 or even 10 times smaller than the amount of magnesium sulphate.

Coating

According a particular embodiment of the present invention, the urea-based composition according to the invention further comprises anti-caking and/or moisture-repellent and/or anti-dust material, applied onto the particulate components of the urea-based composition, in particular the particulate urea base material, as a coating, wherein the coating comprises at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

Examples of suitable anticaking and/or moisture-repellent coatings are vegetable oil (e.g. rapeseed or neem), paraffin and Novoflow anti-caking and/or moisture repellence agents (Novochem Fertilizer Additives, The Netherlands).

Preferably, the moisture-repellent coating is a coating such as disclosed in EP 0768993 A1 (Norsk Hydro ASA) for a nitrogen-containing fertilizer, comprising at least a wax, an oil and a resin which is oil-soluble and miscible with wax.

Urea Base Material

The urea-based composition may comprise any urea base material that has been described in the prior art or that is commercially available.

According to one embodiment, the urea-based composition is a composition which comprised a urea base material comprising finely divided sulphur particles in the urea base material, for example with sulphur particles sizes of smaller than 100 micrometer.

In WO2014/009326 (Shell, 2014) a urea base material comprising elemental sulphur is disclosed, obtained by mixing a first flow comprising a liquid fertilizer with a second flow comprising liquid elemental sulphur in a mixing device in the presence of a multifunctional ionic surfactant to form an emulsion comprising elemental sulphur particles which are coated with a layer of the surfactant and dispersed in a fertilizer material that can be solidified.

In WO2017/005695 (Yara International ASA, 2017) a urea base material comprising elemental sulphur is disclosed, obtained by joining a first flow comprising a liquid urea-based material with a second flow comprising liquid elemental sulphur, which resulting flow is subsequently nebulized into a fluidized bed granulator, where a granulate urea-based fertilizer material comprising very file sulphur particles of less than 10 micrometres is formed.

ReSulf® is an example of a commercial product, sold by Yara International ASA, being a particulate urea-based fertilizer comprising small phases of elemental sulphur with a 42-9S composition, and produced from a micro-emulsified elemental sulphur in a liquid urea basis using a surfactant and solidified using a classical prilling technique.

Not only prills, but also pastilles of a urea-based fertilizer comprising elemental sulphur were produced by Yara International ASA (Oslo, Norway) with a 42-9S composition using a cooling belt (Sandvik, Stockholm, Sweden and in Nitrogen+Syngas 313, September-October 2011).

According to another embodiment, the urea-based composition according to the invention is a composition which comprised a urea base material coated with elemental sulphur, for example in the form of elemental sulphur particles, for example with sulphur particles sizes of smaller than 100 micrometer.

Independently of its method of production, the urea base material may contain from about 0.1 to 20 weight % of elemental sulphur, preferably 1 weight % or more, more preferably 5 weight % or more, more preferably 10 weight % or more, relative to the total weight of the urea base material.

The urea-based composition according to the invention comprises 50 to 99.9 weight %, preferably 75 to 99.9 weight %, more preferably 90 to 99.9 weight % of the urea base material in particulate form, relative to the total weight of the urea-based composition.

The urea-based composition according to the invention may comprise at least 50 weight %, preferably at least 75 weight %, more preferably at least 90 weight % of the urea base material in particulate form, relative to the total weight of the urea-based composition.

According to one embodiment, the urea base material is selected from the group of urea, urea-ammonium sulphate, urea-ammonium phosphate, and any combination thereof.

Preferably, to serve as a fertilizer, the particle size (dp50) of the urea base material in particulate form is between 1 mm and 5 cm, preferably between 1 and 6 mm, preferably between 2 and 4 mm, most preferably between 3.2 and 3.5 mm, as determined by mesh sieve screening.

According to one embodiment, the urea-based composition comprises 90 to 99.9 weight % of a urea base material comprising 0.1 to 20 weight % of elemental sulphur, 0.03 to 0.06 weight % of nBTPT, 0.05 to 0.1 weight % of a magnesium sulphate, and 0.015 to 0.03 weight % of magnesium oxide, adding up to 100 weight %, being the total weight of the composition.

Use

According to a particular embodiment of the invention, the present invention further provides for the use of the particulate urea-based composition, in particular a homogeneous, solid, particulate urea-based composition, as a fertilizer, in particular for supporting the growth of agricultural products on a sulphur-deficient soil. Sulphur-deficient soils are a growing problem:since sulphur is a component of numerous protein enzymes that regulate photosynthesis and nitrogen fixation, when S is limiting, there is less chlorophyll production, which makes the younger leaves of the plant appear yellow, a symptom sometimes confused with N-deficiency.

Manufacturing

According a particular embodiment of the present invention, the invention further relates to a method for the manufacture of a particulate urea-based composition, in particular a homogeneous, solid, particulate urea-based composition, comprising a urea base material comprising elemental sulphur, magnesium sulphate, and a urease inhibitor of the type phosphoric triamide, in particular N-(n-butyl) thiophosphoric triamide (nBTPT).

In particular, the invention relates to a method for the manufacture of a particulate urea-based composition, in particular a homogeneous, solid, particulate urea-based composition, according to the invention, the method comprising the steps of:

1) providing a urea-base material comprising urea base material and elemental sulphur;

2) providing 0.0001 to 5 weight %, relative to the total weight of the composition, of a magnesium sulphate;

3) providing 0.0001 to 1% weight %, relative to the total weight of the composition, of a urease inhibitor of the type phosphoric triamide, preferably N-(n-butyl) thiophosphoric triamide (nBTPT);

4) optionally, providing 0.0001 to 1% weight %, relative to the total weight of the composition, of a compound, selected from the group of calcium oxide, zinc oxide, magnesium oxide, calcium carbonate, and mixtures thereof, 5) optionally, providing coating material, wherein the coating material is able to increase at least the anticaking and/or moisture repellence and/or anti-dust properties of said urea-based composition; and 6) adding the components provided in steps 2), 3), 4) and 5) in any order to the component, provided in step 1).

It was found that the order of addition of the components magnesium sulphate, a urease inhibitor of the type phosphoric triamide, a stabilizer, a co-stabilizer and the coating material was had little effect on the performance of the claimed effects.

Kit of Parts

According a particular embodiment of the present invention, the invention further relates to a kit of parts, comprising an amount of a) magnesium sulphate;

b) a urease inhibitor of the type phosphoric triamide, preferably N-(n-butyl) thiophosphoric triamide (nBTPT);

c) a compound, selected from the group of calcium oxide, zinc oxide, magnesium oxide, calcium carbonate, and mixtures thereof, and d) optionally, one or more anticaking and/or moisture-repellent and/or anti-dust compounds.

The components of such kit of parts can then be added to particulate urea base material in a desired amount to obtain the particulate urea-based composition comprising a urea base material, elemental sulphur, and a urease inhibitor of the type phosphoric triamide according to the invention.

According to one embodiment, the components are provided in separate units. According to another embodiment, the components are premixed and provided in a combined unit. Preferably, they are premixed in a given weight ratio of urease inhibitor of the type phosphoric triamide to magnesium sulphate to of 1:20 to 1:1, preferably 1:15 to 1:1, more preferably 1:10 to 1:1.

Finally, the invention concerns a method for improving the stability of a urease inhibitor of the type phosphoric triamide, in particular N-(n-butyl) thiophosphoric triamide (nBTPT), in a urea-based composition comprising a urea base material comprising 0.1 to 20 weight % of elemental sulphur and said urease inhibitor, by the addition to said composition of 0.0001 to 5 weight %, relative to the total weight of the composition, of a magnesium sulphate.

Detailed embodiments have been discussed herein above and in the following examples.

The preferred embodiments of the method according to the invention will now be illustrated by means of the following non-limitative examples.

EXPERIMENTAL

All examples shown were carried out with a YaraVera® Amidas product, which is a urea-based composition comprising urea ammonium sulfate material.

1. Volatilization Measurements (Ammonia Release 2 L Diffusion Kit)

200 g of UAS product, treated with nBTPT/stabilizer are put in a 2 L plastic container. Through the lid, a Draeger tube is placed for the measurement of vol % ammonia. The Draeger tube turns from yellow to bleu/purple when ammonia is absorbed by the tube. The amount of vol % ammonia released can be followed in time.

2. nBTPT Measurements

For lab scale experiments, 1.2 kg of solid fertilizer material was added to a lab scale drum. In a next step, the nBTPT/stabilizer material was slowly added. A residence time of 10 minutes was applied and the rotating speed of the drum was consequently the same in each experiment. In case a moisture-repellent coating was added, a nebulizer was used and depending on the order of addition, the moisture-repellent coating was added before or after addition of the nBTPT material. Before use, the moisture-repellent coating was preheated to 80° C. Larger scale experiments with amounts up to 40 kg of fertilizer material were performed in a concrete mixer.

The samples were stored under several conditions, dependent on the type of samples:
Bagged at room temperature (18-25° C.)
Bagged at 40° C.
Open to air at room temperature (18-25° C.)

3. HPLC Analysis of nBTPT-Content

HPLC analysis of nBTPT is done as described in the procedure CEN 15688-2007.

4. Products

UAS was obtained from Yara as granules YaraVera® Amidas 40-0-0 (product code PA421X).

Solid N-(n-butyl)thiophosphoric triamide was obtained from Sunfit Chemical Co. (China) (CAS-Nr. 94317-64-3), as a white crystalline solid with a melting point of 58-60° C.

MgO technical grade was obtained from Mannekus & Co B.V., Schiedam, The Netherlands (dp(50)=27 μm, +/−90% purity, 2-2.9% CaO, 1.1% $SiO_2$).

CaO technical grade was obtained from VWR International, Oud-Heverlee, Belgium (91.3% pure, 2.7% $CaCO_3$ and 6% $Ca(OH)_2$), dp(50)=22 μm).

$CaCO_3$ (limestone powder) was obtained from Nordkalk AB, Finland (98.5% pure, dp(50)=7 μm).

$CaSO_4$ anhydrous was obtained from Alfa Aesar, Haverhill, USA.

$MgSO_4$ anhydrous, 99.999%, was obtained from Alfa Aesar, Haverhill, USA.

$MgSO_4$ anhydrous, >99.5%, was obtained from Alfa Aesar, Haverhill, USA.

$MgSO_4$ anhydrous, >98%, was obtained from Ekmekciogullari, Turkey.

$MgSO_4 \cdot 7H_2O$, >99.5%, was obtained from Merck KGaA, Darmstadt, Germany.

Coating: Moisture-repellent (MR) coating was made according to EP 0768993 A1 (Norsk Hydro ASA) by mixing about 28 weight % of wax, about 68 weight % of oil and about 4 weight % of a resin, applied in an amount of about 0.1-0.5 weight % to the fertilizer. It will be referred herein as NH-coating.

Experiment 1 (Ammonia Release)

Figure 1:
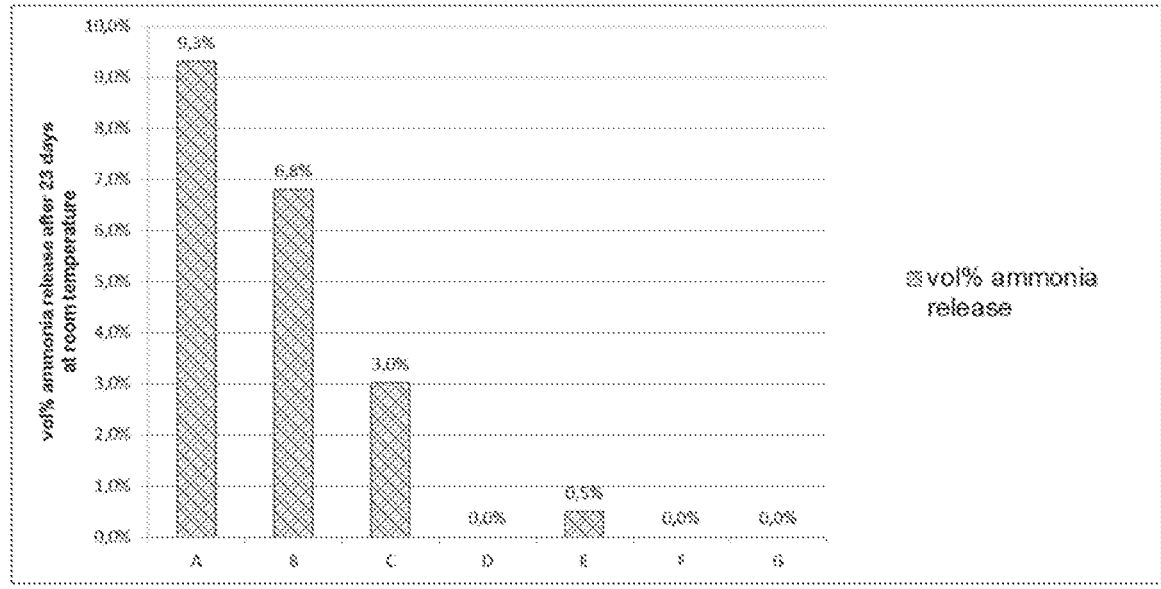
FIG. 1. Ammonia release of a YaraVera® Amidas product comprising 462 ppm nBTPT, treated with several stabilizers (see Table 1).

Experiment 1 defines the problem. FIG. 1 shows the ammonia release of a YaraVera® Amidas product comprising 462 ppm nBTPT, treated with several stabilizers. The numbers between brackets represent, for each stabilizer compound, the weight ratio of the said stabilizer compound compared to nBTPT.

TABLE 1

Ammonia release with different stabilizers

| Example | Stabilizer composition |
|---|---|
| A (prior art) | MgO (4.3) |
| B (prior art) | CaO-G-0554 (5.5) |
| C (prior art) | MgO (0.86) |
| D (prior art) | none |
| E (prior art) | $CaCO_3$ (9.98) |
| F (prior art) | $CaSO_4$ (12.1) |
| G | $MgSO_4$ (10.7) |

Although compounds such as MgO and CaO are mentioned in the prior art document WO2018/069486 (Yara International, 2018) as most effective stabilizers for nBTPT in the presence of a urea base material comprising elemental sulphur, these compounds are observed as producing ammonia in the presence of said material, which is an unwanted effect of these stabilizers. Only without stabilizer, and with $MgSO_4$ and with $CaSO_4$, there is no ammonia release.

Experiment 2

Figure 2A:
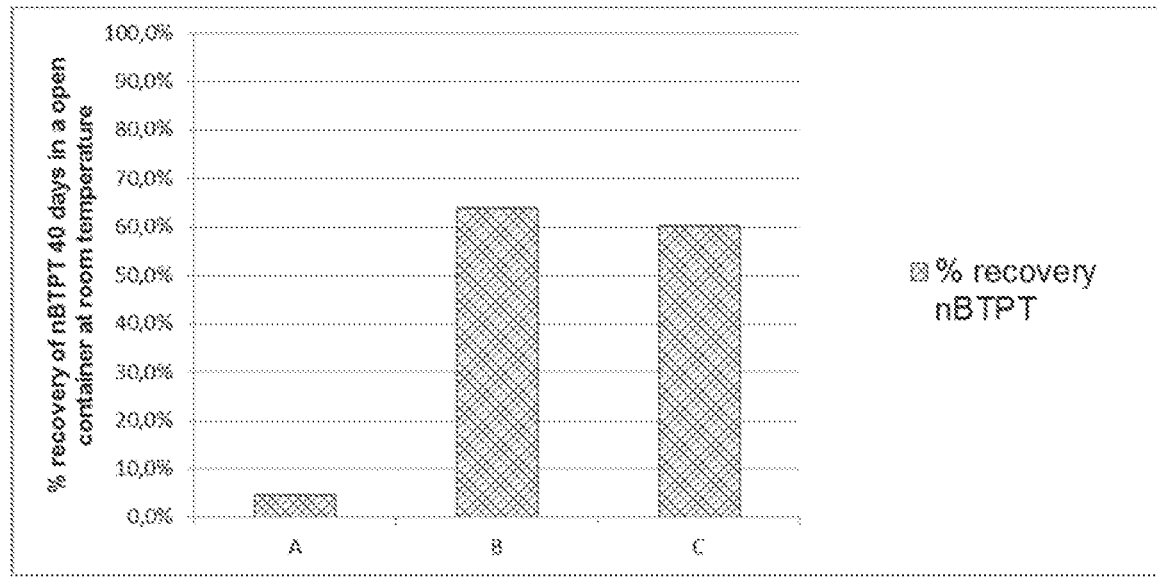
FIG. 2A. Stability of nBTPT on a YaraVera® Amidas product comprising 462 ppm nBTPT in plastic containers open to air at room temperature after 40 days [A=no stabilizer; B=CaO (2541 ppm); C=$MgSO_4$ 99.5% purity (4957 ppm)].
Figure 2B:
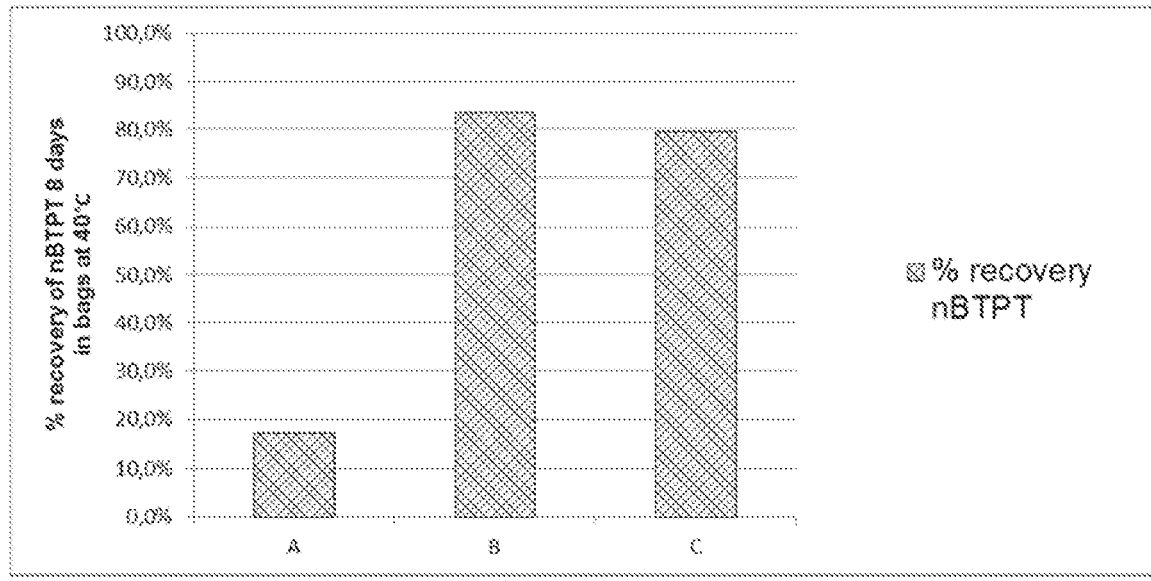
FIG. 2B. Stability of nBTPT on a YaraVera® Amidas product comprising 462 ppm nBTPT, in bags at 40° C. [A=no stabilizer; B=CaO (2541 ppm); C=$MgSO_4$ 99.5% purity (4957 ppm)] after 8 days.

This experiment was conducted to show the difference between the beneficial effect of the addition of an alkaline or alkaline-forming inorganic or organic compound (CaO—prior art) and $MgSO_4$ (VWR grade 99.5%) to UAS on the stability of nBTPT in the presence of UAS open to the air at room temperature (FIG. 2A) and in bags at elevated temperature (FIG. 2B). As can be seen, the stabilizing effect of $MgSO_4$ is comparable with the effect of the prior art compound (CaO), but no ammonia is generated (as shown in FIG. 1).

Experiment 3 (Different Grades)

Figure 3:
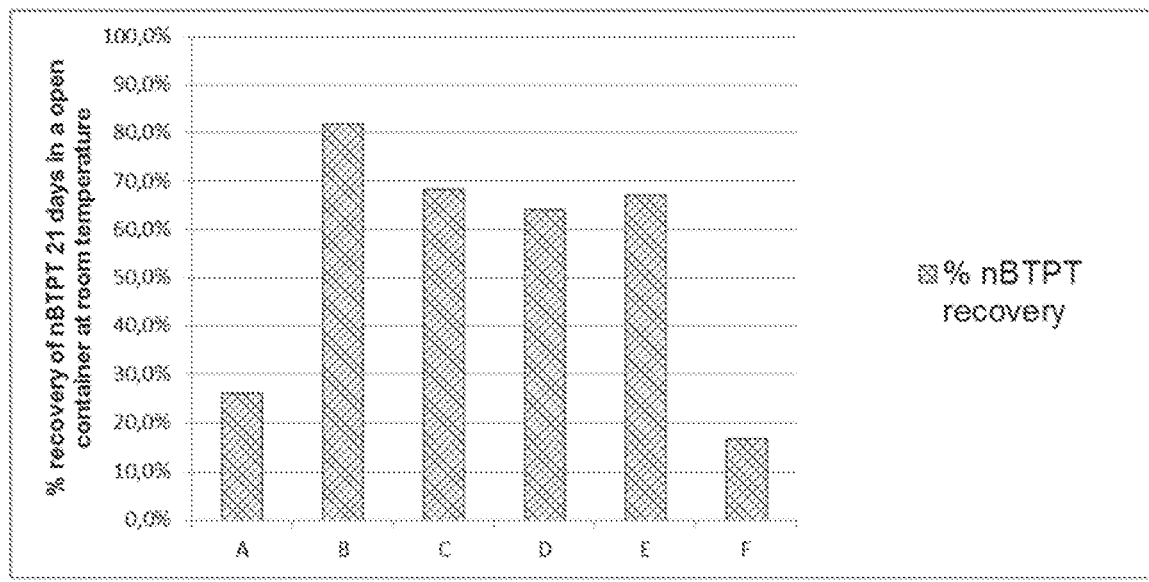
FIG. 3. Stability of nBTPT on a YaraVera® Amidas product comprising 462 ppm nBTPT using different grades and forms of $MgSO_4$ and $Na_2SO_4$, stored in open plastic containers at room temperature for 21 days. [A=no stabilizer; B=CaO (2541 ppm); C=$MgSO_4$ 99.5% purity (4957 ppm); D=$MgSO_4$ 99.999% purity (4957 ppm); E=$MgSO_4 \cdot 7H_2O$ (10163 ppm; F=$Na_2SO_4$ (5849 ppm]
Figure 4:
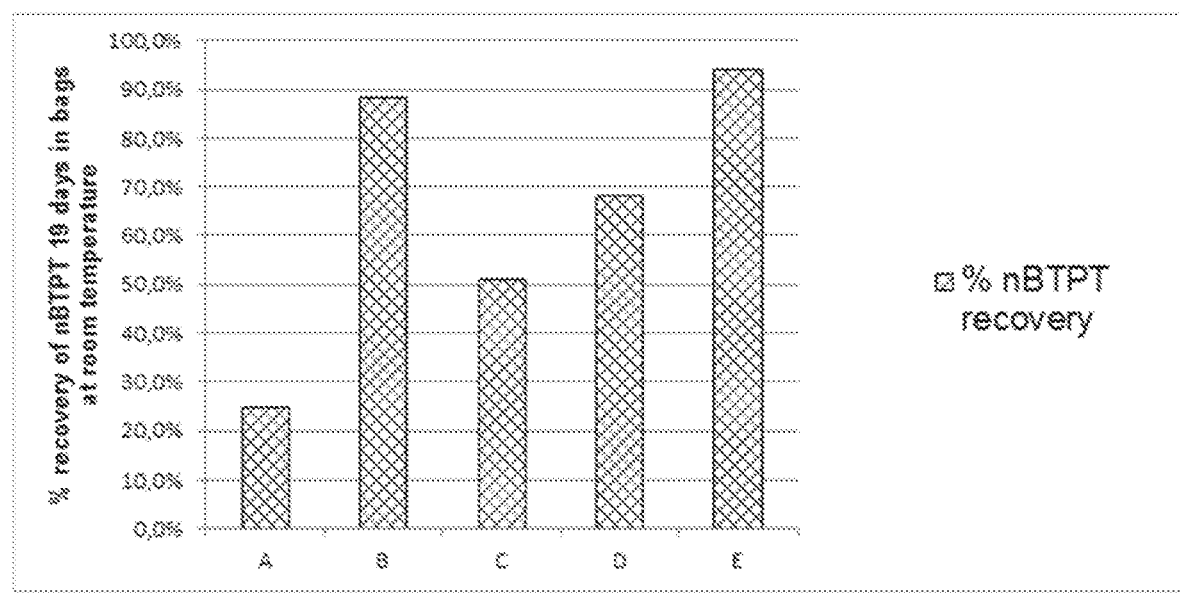
FIG. 4. Stability of nBTPT on a YaraVera® Amidas product comprising 462 ppm nBTPT using different $MgSO_4/MgO$ combinations [A=no stabilizer; B=CaO (2310 ppm); C=MgO (212 ppm); D=$MgSO_4$>98% grade (4620 ppm); E=$MgSO_4$>98% grade (924 ppm)/MgO (212 ppm)]

This experiment shows the effect of the addition of different grades and forms of $MgSO_4$ and also another sulfate, $Na_2SO_4$, compared to the prior art compound CaO for open to air storage conditions at room temperature (FIG. 3). All $MgSO_4$ grades give a comparable nBTPT stability on the YaraVera® Amidas product. This experiment shows that the stabilizing effect of $MgSO_4$ on nBTPT on UAS is not 100% based on a pH effect (alkaline pH 8.5 for $MgSO_4$ 99.5% versus acidic pH 6.1 for $MgSO_4$ 99.999%) and also not 100% based on the waterbinding effect of anhydrous $MgSO_4$ as $MgSO_4 \cdot 7H_2O$ delivers similar nBTPT stability. $Na_2SO_4$ actually has a negative effect on the stability of nBTPT. This shows the unique stabilizing effect of magnesium sulphate.

Experiment 4 (Effect of Addition of Oxides and Synergetic Effect of $MgSO_4$ and MgO)

This experiment shows the effect of the addition of a small amount of oxide to the stabilizer. Small amounts of $MgSO_4$, which have little effect, become very effective in a combination with MgO (see D versus E). The effect is synergetic (see C+D versus E) and not additive. There is almost no difference in stability depending on the method of combining the components of the stabilizer composition (i.e. adding the components one by one in any order/making a pre-mix of the components and adding the pre-mix to UAS). MgO was found more effective than CaO, but it is assumed that any alkaline or alkaline-forming compound, selected from the group of calcium oxide, zinc oxide, magnesium oxide, calcium carbonate, and mixtures thereof, is effective.

The invention claimed is:

1. A particulate, urea-based composition comprising:
at least 75 weight % of a particulate urea base material based on the total weight of the urea-based composition, the particulate urea base material comprising at least 1 weight % elemental sulphur, based on the total weight of the urea base material;
0.02 to 0.2 weight % of a phosphoric triamide urease inhibitor based on the total weight of the urea-based composition; and
0.05 to 5 weight % of magnesium sulphate based on the total weight of the urea-based composition, wherein a ratio of the urease inhibitor to the magnesium sulphate is 1:20 to 1:10.

2. The urea-based composition according to claim 1, wherein the urea-based composition further comprises an alkaline or alkaline-forming compound selected from the group consisting of calcium oxide, zinc oxide, magnesium oxide, calcium carbonate, and mixtures thereof.

3. The urea-based composition according to claim 2, wherein the weight ratio of alkaline or alkaline-forming compound to magnesium sulphate ranges from 1:20 to 1:2.

4. The urea-based composition of claim 3, wherein the weight ratio of alkaline or alkaline-forming compound to magnesium sulphate is from 1:15 to 1:2.

5. The urea-based composition according to claim 1, wherein the urea-based composition further comprises anticaking and/or moisture-repellent and/or anti-dust material.

6. The urea-based composition according to claim 5, wherein the anticaking and/or moisture-repellent coating comprising at least a non-polar material, present in the composition at a level of 0.0001 to 1 weight %.

7. The urea-based composition of claim 6, wherein the non-polar material is selected from the group consisting of oil, wax, resin and mixtures thereof.

8. The urea-based composition according to claim 1, wherein the urease inhibitor is N-(n-butyl) thiophosphoric triamide (nBTPT).

9. The urea-based composition according to claim 8, wherein the urea-based composition comprises 90 to 99.9 weight % of a urea base material comprising 0.03 to 0.06 weight % of nBTPT, 0.05 to 0.1 weight % of magnesium sulphate, and 0.015 to 0.03 weight % of magnesium oxide, adding up to 100 weight %, being the total weight of the composition.

10. The urea-based composition according to claim 1, wherein the magnesium sulphate is selected from the group consisting of anhydrous, mono-, di-, tri-, tetra-, penta-, hexa-, heptahydrate, and mixtures thereof.

11. The urea-based composition according to claim 1, wherein the phosphoric triamide urease inhibitor is a compound of formula I:

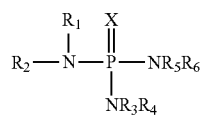

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_a$, $R_5$ and $R_6$ are individually hydrogen or alkyl having 1 to 6 carbon atoms; and
alkyl, cycloalkenyl, aralkyl, aryl, alkenyl, alkynyl, and cycloalkyl refer to compounds having from 1 to 10 carbon atoms.

12. The urea-based composition according to claim 1, wherein the urease inhibitor of the type phosphoric triamide is present onto the urea base material in liquid or in particulate form, is present as a melt-mixed component within the particles of the urea base material, or a combination thereof.

13. The urea-based composition according to claim 1, wherein the urea base material comprises finely divided sulphur particles in a urea base material, or a urea base material coated with elemental sulphur.

14. The urea-based composition according claim 1, wherein, the urea base material is selected from the group consisting of urea, urea-ammonium sulphate, urea-ammonium phosphate, and combinations thereof.

15. The urea-based composition according to claim 1, wherein the average particle size (dp50) of the urea base material in particulate form is between 1 mm and 5 cm, as determined by mesh sieve screening.

16. A method comprising fertilizing a soil with the particulate urea-based composition as claimed in claim 1.

17. A method for the manufacture of a particulate urea-based composition according to claim 1, the method comprising the steps of:
1) providing at least 75 weight % of a particulate urea base material based on the total weight of the urea-based composition, the particulate urea base material comprising at least 1 weight % elemental sulfur;
2) providing 0.05 to 5 weight %, relative to the total weight of the composition, of magnesium sulphate;
3) providing 0.02 to 0.2 weight %, relative to the total weight of the composition, of a phosphoric triamide urease inhibitor wherein a ratio of the urease inhibitor to the magnesium sulphate is 1:20 to 1:10;
4) optionally, providing 0.0001 to 1% weight %, relative to the total weight of the composition, of an alkaline or alkaline-forming compound, selected from the group consisting of calcium oxide, zinc oxide, magnesium oxide, calcium carbonate, and mixtures thereof, and 5) optionally, providing coating material, wherein the coating material increases the anticaking and/or moisture repellence and/or anti-dust properties of said urea-based composition; and
6) adding the components provided in steps 2), 3), 4) and 5) in any order to the component, provided in step 1).

18. The urea-based composition of claim 17, wherein the urease inhibitor is N-(n-butyl) thiophosphoric triamide.

19. A method for improving the stability of a phosphoric triamide urease inhibitor in a urea-based composition comprising a urea base material comprising 0.1 to 20 weight % of elemental sulphur and said urease inhibitor, the method comprising adding to said composition 0.05 to 5 weight % of magnesium sulphate, relative to the total weight of the composition, wherein a ratio of the urease inhibitor to the magnesium sulphate is 1:20 to 1:10.

20. The urea-based composition of claim 19, wherein the urease inhibitor is N-(n-butyl) thiophosphoric triamide.

* * * * *